(12) United States Patent
Gür

(10) Patent No.: US 7,799,472 B2
(45) Date of Patent: Sep. 21, 2010

(54) HIGH TEMPERATURE DIRECT COAL FUEL CELL

(75) Inventor: Turgut M. Gür, 1595 Walnut Dr., Palo Alto, CA (US) 94303

(73) Assignee: Turgut M. Gür, Palo Alto, CA (US)

( * ) Notice: Subject to any disclaimer, the term of this patent is extended or adjusted under 35 U.S.C. 154(b) by 139 days.

(21) Appl. No.: 11/372,553

(22) Filed: Mar. 9, 2006

(65) Prior Publication Data

US 2006/0257702 A1 Nov. 16, 2006

Related U.S. Application Data

(60) Provisional application No. 60/681,920, filed on May 16, 2005.

(51) Int. Cl.
*H01M 8/06* (2006.01)
*H01M 8/04* (2006.01)
*H01M 8/10* (2006.01)

(52) U.S. Cl. .................. 429/408; 429/430; 429/486; 429/497

(58) Field of Classification Search ............. 429/27, 429/30, 13, 31, 17
See application file for complete search history.

(56) References Cited

U.S. PATENT DOCUMENTS

| 4,804,592 | A | 2/1989 | Vanderborgh et al. |
| 5,376,469 | A | 12/1994 | Gür et al. ............. 429/17 |
| 6,183,896 | B1 * | 2/2001 | Horita et al. .......... 429/30 |

(Continued)

FOREIGN PATENT DOCUMENTS

GB 2278010 A 11/1994

(Continued)

OTHER PUBLICATIONS

Earth Day, Article found on Wikipedia, Apr. 25, 2008 (en.wikipedia.org/wiki/Earth_Day) (relevant portions displayed in text).*

(Continued)

*Primary Examiner*—Patrick Ryan
*Assistant Examiner*—Thomas H. Parsone
(74) *Attorney, Agent, or Firm*—Lumen Patent Firm

(57) ABSTRACT

The invention relates to direct conversion of coal into electricity in a high temperature electrochemical generator in a single step process. This novel concept promises nearly doubling the conversion efficiency of conventional coal-fired processes and offering near-zero emissions. The improved efficiency would mean that nearly half as much coal is mined and transported to the power plant, and half the greenhouse gases and other pollutants such as sulfur, mercury and dioxins are produced. It also offers several crucial distinctions from conventional coal-burning processes. Since the process does not involve the combustion of coal in air, it does not involve nitrogen and hence generates practically no NOx. Accordingly, there is also no latent heat lost to nitrogen. In this process, the oxygen necessary to oxidize coal is supplied through an ion selective ceramic membrane electrolyte. The resultant product stream primarily consists of $CO_2$ and, hence, it is easier and cheaper to capture and sequester, compared to waste streams from conventional combustion processes where $CO_2$ ordinarily constitutes about 15-20% of the flue stream, in which case it may first be separated from other constituents before sequestration.

30 Claims, 9 Drawing Sheets

U.S. PATENT DOCUMENTS

| | | | | |
|---|---|---|---|---|
| 6,548,197 | B1 | 4/2003 | Chandran et al. | |
| 6,572,996 | B1* | 6/2003 | Isenberg et al. | 429/31 |
| 6,692,861 | B2* | 2/2004 | Tao | 429/44 |
| 6,793,711 | B1 | 9/2004 | Sammels | |
| 7,229,710 | B2* | 6/2007 | Tao et al. | 429/13 |
| 2002/0015871 | A1* | 2/2002 | Tao et al. | 429/27 |
| 2002/0170436 | A1* | 11/2002 | Keefer et al. | 96/121 |
| 2003/0143448 | A1* | 7/2003 | Keefer | 429/26 |
| 2004/0202914 | A1 | 10/2004 | Sridhar et al. | |
| 2004/0224193 | A1 | 11/2004 | Mitlsky et al. | |
| 2006/0234098 | A1* | 10/2006 | Gur | 429/30 |
| 2008/0022593 | A1* | 1/2008 | Gur et al. | 48/116 |

FOREIGN PATENT DOCUMENTS

| | | |
|---|---|---|
| WO | WO 99/52166 | 10/1999 |

OTHER PUBLICATIONS

Goldberg, Philip and Robert Romanosky. CO2 Mineral Sequestration Studies in US. Aug. 13-15, 2000. Fifth International Conference on Greenhouse Gas Gontrol Technologies. Available at: www.netl.doe.gov/technologies/carbon_seq/refshelf/presentations/mineralseq.PDF.*

Goldberg, Philip, Zhong-Ying Chen, William O'Connor, Richard Walters, and Hans Ziock. CO2 Mineral Sequestration Studies in US. 2001 Conference Proceedings, First National Conference on Carbon Sequestration. Available at: www.netl.doe.gov/publications/proceedings/01/carbon_seq/6c1.pdf.*

"Capturing and Sequestering Carbon Dioxide" in U.S. Climate Change Technology Program—Technology Options for the Near and Long Term. Nov. 2003. pp. 122-123. available at: www.climatetechnology.gov/library/2003/tech-options/tech-options-3-1-1.pdf Entire Document available at: www.climatetechnology.gov/library/2003/tech-options/tech-options.*

Hanaoka, T., S. Fujimoto, T. Yoshida, K. Kamei, M. Harada, Y. Suzuki, S. Yoloyama, T. Minowa. Hydrogen Production from Woody Biomass by Novel Gassification Using CO2 Sorbent. 2004. Studies in Surface Science and Catalysis, vol. 153. pp. 103-108.*

Hanaoka, Toshiaki., Takahiro Yoshida, Shinji Fujimoto, Kenji Kamei, Michiaki Harada, Yoshizo Suzuki, Hiroyuki Hatano, Shin-ya Yokoyama, and Tomoaki Minowa. Hydrogen Production from Woody Biomass by Steam Gassification Using CO2 Sorbent. Published online: Jul. 2004. Biomass and Bioenergy, vol. 28. pp. 63-68.*

EPA. Earth Day Apr. 22. Online at: www.epa.gov/earthday/history.htm.*

T.M Gür and R.A. Huggins, "Direct Electrochemical Conversion of Carbon to Electrical Energy in a High Temperature Fuel Cell", J. Electrochem. Soc. 139, L95 (1992).

* cited by examiner

HIGH TEMPERATURE DIRECT COAL FUEL CELL

RELATED APPLICATIONS

This application claims priority under 35 U.S.C. §119(e) to provisional application No. 60/681,920 filed on May 16, 2005 titled "High Temperature Direct Coal Fuel Cell."

FIELD OF THE INVENTION

This invention relates to the field of fuel cells, and in particular to the field of high temperature fuel cells for the direct electrochemical conversion of carbon-containing materials (such as coal) to electrical energy. This invention is further directed to fuel cells employing a single temperature zone. This invention is further directed to fuels cells wherein therein is direct physical contact of the anode surface with carbon particles.

BACKGROUND OF THE INVENTION

Coal is the most abundant and inexpensive energy source on our planet with sufficient reserves to meet a large fraction of the world's energy needs for many decades, even centuries to come. Other energy sources such as wind, solar, geothermal, and nuclear offer limited capacity only. As demand for energy resources increases with accelerating pace to fuel the rapidly growing economies of populated countries like China, India, Brazil and Russia, there is a compelling and impending need to find more efficient and responsible ways to use coal, as these countries both possess vast reserves of this valuable resource and use it in great proportion for their electricity generation. For example, China generates more than 70% of its electricity from coal. That number is about 56% for the US.

Conversion of the chemical energy of coal to electricity ordinarily requires multiple processing steps that suffer from Carnot constraints and ultimately results in low conversion efficiencies. Typically, subcritical coal fired power plants operate with poor efficiencies of 33-35%. Recently, emerging coal technologies have slightly improved efficiencies that may reach up to 42-45% for ultra-super critical and integrated gas combined cycle processes. However, these are relatively new and expensive technologies with capital costs in excess of $1700/kW without $CO_2$ capture and more than $2200/kW with $CO_2$ capture [N. Holt, GCEP Advanced Coal Workshop, Provo, Utah, Mar. 15, 16 (2005)].

In contrast, the process of direct electrochemical conversion of coal to electrical energy proposed here is a single step process and is not subject to Carnot constraint. Hence, it offers the possibility of achieving substantially higher conversion efficiencies than chemical conversion processes. This is partly due to the high ceiling value of the theoretical efficiency for electrochemical conversion of carbon to carbon dioxide, which remains at about 100% even at elevated temperatures due to near-zero entropy change of the reaction.

Possibility of direct coal conversion in a fluidized bed fuel cell was originally suggested by Gür [T. M. Gür and R. A. Huggins, J. Electrochem. Soc. 139 (#10), L95 (1992), U.S. Pat. No. 5,376,469 Dec. 27, 1994] that utilized a fixed carbon bed in a solid oxide fuel cell. This early attempt employed a thick (1.5 mm wall) stabilized zirconia tube. It was also a preliminary study for proof-of-concept only that was far from being optimized. Nevertheless, it successfully demonstrated that it was possible to draw currents in excess of 30 mA/cm$^2$ and obtain open circuit voltages that agreed with theoretically expected values.

The quest for direct carbon conversion to electricity is not new, however, and has been pursued in waves of activity for over 150 years. The earliest attempt to directly consume coal in a fuel cell was made by Becquerel in 1855[K. R. Williams, in "An Introduction to Fuel Cells", Elsevier Publishing Company, Amsterdam (1966), Chap.1]. He used a carbon rod as the anode and platinum as the oxygen electrode in a fuel cell that employed molten potassium nitrate as the electrolyte. When oxygen was blown on to the Pt electrode a current was observed in the external circuit. However, his results were not encouraging because of the direct chemical oxidation of carbon by the potassium nitrate electrolyte.

Near the turn of the century, Jacques [W. W. Jacques, Harper's Magazine, 94, 144 (December 1896-May 1897)] used a molten sodium hydroxide electrolyte contained in an iron pot, which served as the air cathode, and a carbon rod as the consumable anode. The cell was operated at about 500° C. and current densities of over 100 ma/cm$^2$ were obtained at about 1 volt. He constructed a 1.5 kW battery consisting of over 100 of these cells and operated it intermittently for over six months. Unfortunately, Jacques did not give reliable information about cell characteristics and life of his battery. Haber and Brunner [F. Haber and L. Bruner, Z. Elektrochem., 10,697 (1904)] suggested that the electrochemical reaction at the anode in the Jacques cell was not the oxidation of carbon but of hydrogen that was produced, along with sodium carbonate, by the reaction of carbon with molten sodium hydroxide. Owing to this undesirable side reaction involving the electrolyte and rendering it unstable in that environment, Baur and co-workers [E. Baur, Z. Elektrochem., 16,300 (1910); E. Baur and H. Ehrenberg, Z. Elektrochem., 18,1002 (1912); E. Baur, W. D. Treadwell and G. Trumpler, Z. Elektrochem., 27,199 (1921)] abandoned the molten alkali electrolytes and replaced them by molten salts such as carbonates, silicates and borates.

In 1937, Baur and Preis [E. Baur and H. Preis, Z. Elektrochem., 43,727 (1937)] suggested that the condition for a chemically stable electrolyte can only be met by the use of an ionically conducting solid electrolyte. For this purpose, they built a battery consisting of eight yttria stabilized zirconia electrolyte crucibles immersed in a common magnetite (i.e., $Fe_3O_4$) bath. The anode compartment was filled with coke and the cell was operated at about 1050° C. The open circuit battery potential was 0.83 volts, about 0.2 volts lower than that measured with single cells. At a cell voltage of about 0.65 volts the current density was about 0.3 mA/cm$^2$, too low for practical use. Furthermore, at these high operating temperatures, it is thermodynamically possible to carry out only partial oxidation of carbon, which would hence reduce the efficiency of the fuel cell significantly.

In the last several decades, high temperature fuel cells employing either molten carbonate or solid oxide ceramic electrolytes have been reported. In these cells, coal derived fuels [D. H. Archer and R. L. Zahradnik, Chem. Eng. Progr. Symp. Series, 63,55 (1967)], $H_2$ [J. Weissbart and R. Ruka, in "Fuel Cells",Vol. 2, G. J. Young (ed.), Reinhold Publishing Corp., New York (1963)] and $CH_4$ [J. Weissbart and R. Ruka, J. Electrochem. Soc., 109,723 (1962)] were employed as consumable gaseous fuels. Presently, the high temperature solid oxide fuel cells under development in various laboratories around the world use $H_2$ derived either from natural gas or from coal.

More recently, there have been several development efforts that utilize some form of a molten medium in an attempt to generate electricity from carbon. The molten media that were employed can be grouped of two categories, namely, molten salts and molten metals, both of which serve to hold the carbon source.

Molten Salt Electrolyte Based DCFC

Scientific Applications and Research Associates, Inc. (SARA) has been involved in developing a molten hydroxide fuel cell operating at 400-500° C. [www.sara.com/energy; "Carbon Air Fuel Cell" U.S. Pat. No. 6,200,697 (Mar. 3, 2001)]. The cell consists of a carbon anode surrounded by a molten hydroxide electrolyte. Air is forced over the metallic cathode where the reduction of oxygen generates hydroxide ions. The hydroxide ions are transported through the molten NaOH electrolyte to the anode where they react with the carbon anode releasing $CO_2$, $H_2O$, and electrons. These electrons travel through the external circuit to the cathode, and generate electricity.

Building upon the earlier work done at SRI International by Weaver and co-workers [R. D. Weaver, S. C. Leach, A. E. Bayce, and L. Nanis, "Direct Electrochemical Generation of Electricity from Coal", SRI, Menlo Park, Calif. 94025; SAN-0115/105-1 (1979)] who employed a carbon anode in a molten carbonate electrolyte system for direct conversion of carbon to electricity, Lawrence Livermore National Laboratory [N. J. Cherepy, R. Krueger, K. J. Fiet, A. J. Jankowski, and J. F. Cooper, J. Electrochem. Soc. 152(1), A80 (2005); J. F. Cooper "Direct Conversion of Coal and Coal-Derived Carbon in Fuel Cells", Second International Conference on Fuel Cell Science, Engineering and Technology, ASME, Rochester, N.Y., Jun. 14-16, 2004; "Fuel Cell Apparatus and Method Thereof", U.S. Pat. No. 6,815,105 (Nov. 9, 2004)] has been developing a similar system which employs a molten carbonate electrolyte that holds nanosize carbon particles dispersed in it. The anode and cathode compartments are separated by a porous yttria stabilized zirconia (YSZ) matrix, which serves to hold the molten electrolyte and allows transport of carbonate ions from the anode side to the cathode compartment. Suitable metals such as Ni are employed for anode and cathode materials. At the anode, dispersed carbon particles react with the carbonate ion to form $CO_2$ and electrons, while oxygen from air react with $CO_2$ at the cathode to generate carbonate ions. As the carbonate ions formed at the cathode migrate through the molten electrolyte towards the anode, the electrons liberated at the anode travel through the external circuit towards the cathode generating electricity.

Molten Anode Based DCFC

Yentekakis and co-workers [I. V. Yentekakis, P. G. Debenedetti, and B. Costa, Ind. Eng. Chem. Res. 28, 1414 (1989)] published a paper-study and proposed the concept for and simulated the expected performance of a direct carbon conversion fuel cell employing a molten Fe anode and an yttria stabilized zirconia (YSZ) solid electrolyte immersed in the molten anode. The operating temperature of such a cell would necessarily be higher than the melting point of Fe, which is 1535° C. Indeed, their modeling was done for extremely high temperatures up to 2227° C. (or 2500° K). It was assumed that finely divided carbon particles are dispersed in the molten Fe anode. They suggested coating the cathode side of the YSZ electrolyte with a porous layer of Pt where the oxygen from the air would undergo a reduction reaction. The resulting oxide ions would be transported through the YSZ solid electrolyte towards the anode where they would emerge into the molten Fe bath and react with the dispersed carbon particles. The electrons released during this anodic reaction would travel in the external circuit generating electricity.

A similar approach has been pursued by CellTech Power, Inc., which recently patented ["Carbon-Oxygen Fuel Cell", U.S. Pat. No. 6,692,861 B2 (Feb. 17, 2004)] a fuel cell that uses a carbon-based anode. Their web site portrays a fuel cell [www.celltechpower.com] that employs molten Sn as anode and reports that the cell operates in a two-step process. During the first phase, the oxygen transported through a stabilized zirconia solid electrolyte oxidizes the molten Sn anode to SnO. In the second step, carbon fuel delivered into the anode compartment reduces the SnO back to metallic Sn, and the cycle is repeated.

The present invention is fundamentally different from these prior approaches. It employs a dense and nonporous solid oxide ceramic electrolyte for selectively transporting oxygen necessary for oxidizing carbon. While others employ either electronically nonconducting molten salt electrolytes or electronically conducting molten metal anodes, the proposed concept uses instead a gas-solid system where mass transport and kinetic rates are significantly higher than for liquid-solid systems. Hence, the expected power densities in this proposal will proportionately be higher. Operationally, it also less complicated to deal with and study reactions in gas-solid interfaces than in the double and triple phase interfaces employed in the molten electrolyte or molten anode gas-solid-liquid systems above.

Properties of Solid Oxide Electrolytes

An important component of the direct coal fuel cell (DCFC) is the solid oxide electrolyte that facilitates selective oxide ion transport and supplies the oxygen for the oxidation of carbon and other reactants (such as hydrogen, sulfur etc) at the anode. Predominantly oxide-ion conducting solids have been known to exist for almost a century [W. Nernst, Z. Elektrochem., 6,41 (1900)]. Among these solids, zirconia-based electrolytes have widely been employed as electrolyte material for solid oxide fuel cells (SOFC).

Zirconium dioxide has three well-defined polymorphs, with monoclinic, tetragonal and cubic structures. The monoclinic phase is stable up to about 1300° C. and then transforms to the tetragonal phase. The cubic phase is stable above 2200° C. with a $CaF_2$ structure. The tetragonal-to-monoclinic phase transition is accompanied by a large molar volume (about 4%), which makes the practical use of pure zirconia impossible for high temperature refractory applications. However, addition of 8-15 m % of alkali or rare earth oxides (e.g., CaO, $Y_2O_3$, $Sc_2O_3$) stabilizes the high temperature cubic fluorite phase to room temperature and eliminates the undesirable tetragonal-to monoclinic phase transition at around 1300° C. The dopant cations substitute for the zirconium sites in the structure. When divalent or trivalent dopants replace the tetravalent zirconium, a large concentration of oxygen vacancies is generated to preserve the charge neutrality of the crystal. It is these oxygen vacancies that are responsible for the high ionic conductivity exhibited by these solid solutions. These materials also exhibit high activation energy for conduction [T. M. Gür, I. D. Raistrick and R. A. Huggins, Mat. Sci. Engr., 46, 53 (1980); T. M. Gür, I. D. Raistrick and R. A. Huggins, Solid State Ionics, 1, 251 (1980)] that necessitates elevated temperatures in order to provide sufficient ionic transport rates. The electronic contribution to the total conductivity is several orders of magnitude lower than the ionic component at these temperatures. Hence, these materials can be employed as solid electrolytes in high temperature electrochemical cells.

Ionic conduction in these materials is a highly thermally activated process with strong temperature dependence and large activation energy of about 1 eV. In fact, ionic conductivity for the oxide ions increases exponentially with temperature, dictating the need of high operating temperatures for fast transport rates. Therefore, it is desirable for the solid oxide electrolyte to operate between 600 to 1100° C. in order to provide sufficiently fast transport rates for the oxide ions that would make it attractive for practical use.

The chemical potential difference of oxygen across the solid oxide electrolyte is a measure of the open circuit potential given by the Nernst Equation, $$E = -(RT/nF)\ln(PO_2'/PO_2'') \tag{1}$$

where E is the equilibrium potential of the fuel cell under open circuit conditions, R is the gas constant, F is Faraday's constant, n is the number of electrons per mole (in the case of $O_2$, n =4), and $PO_2$ denotes the partial pressure of oxygen.

SUMMARY OF THE INVENTION

The invention is directed to a fuel cell for the direct conversion of a carbon-containing fuel into electricity. The fuel cell comprises an anode, a cathode, and an electrolyte. In a preferred embodiment, there is a thin film solid oxide electrolyte which is sandwiched between a porous cathode and an outer porous anode layer. In a preferred embodiment, the fuel cell operates at elevated temperature, with a single temperature zone. In another preferred embodiment, the fuel cell utilizes direct physical contact of an anode surface with carbon-containing particles.

DETAILED DESCRIPTION OF THE INVENTION

The electrochemical conversion of coal into electricity involves a high temperature fuel cell that features an oxide ion selective solid electrolyte that supplies the oxygen required for the electrochemical oxidation of carbon. Pulverized coal is introduced into the anode compartment of the cell with or without other solid constituents, such as sequestering agents for capturing the $CO_2$ and $SO_2$ produced.

Figure 1:
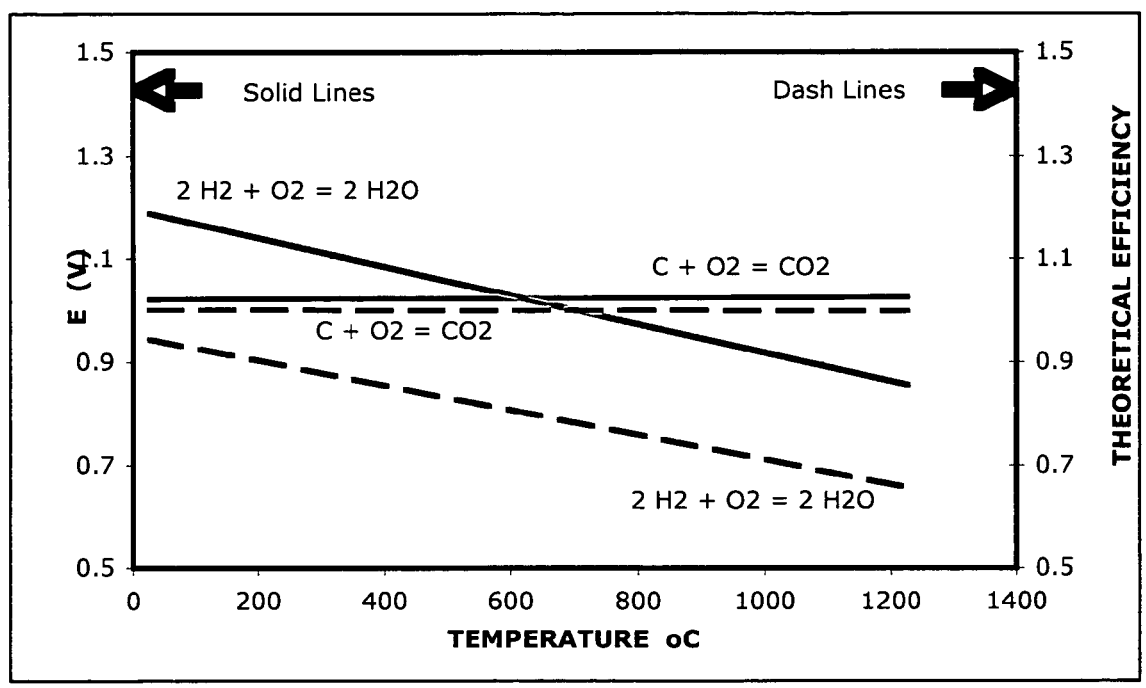
FIG. 1 shows the theoretical conversion efficiency and the expected open circuit voltage as a function of temperature for the electrochemical oxidation reaction of carbon. Note the temperature independence of E and efficiency for the carbon oxidation reaction, while the behavior is strongly dependent on temperature for the case of hydrogen FIG. 2. Schematic design and operating principle of the direct carbon fuel cell depicting the details of the cell cross section (not to scale), ionic transport, and electrode reactions. Right: The thin film solid oxide electrolyte (white annulus) is sandwiched between the porous cathode support tube indicated by the inner gray shade, and the outer porous anode layer. Left: solid electrolyte and the cathode allows transport of oxide ion only, which oxidize carbon at the anode and release its electrons to the external circuit generating electricity. In a preferred embodiment, the direct carbon fuel cell may be operated at a single temperature, such that the reaction is in a single temperature zone.

FIG. 1 shows the theoretical conversion efficiency and the expected open circuit voltage as a function of temperature for the electrochemical oxidation reaction of carbon. Note the temperature independence of E and efficiency for the carbon oxidation reaction, while the behavior is strongly dependent on temperature for the case of hydrogen.

Referring to Eq. (1), the open circuit voltage of the fuel cell is determined by the carbon-oxygen equilibrium at the anode, since the oxygen activity on the cathode side is fixed by air. FIG. 1 shows the theoretical conversion efficiency and the expected open circuit voltage as a function of temperature for the electrochemical oxidation reaction of carbon. The figure also compares the carbon-oxygen couple with that for hydrogen, which shows strong temperature dependence. In other words, a solid oxide fuel cell (SOFC) using hydrogen as fuel and operating at high temperatures will have significantly lower open circuit voltage as well as theoretical efficiency than one that employs carbon as fuel. This is primarily because the entropy change during carbon oxidation is negligibly small, and the Gibbs free energy for carbon oxidation is nearly independent of temperature. The situation is different for the oxidation of hydrogen, which exhibits a strongly negative temperature dependence. Moreover, for hydrogen to be employed as fuel, it needs to be produced from other resources first, while carbon is an abundant and cheap source of energy that is readily available. So there is a great incentive to employ the carbon-oxygen couple. Indeed, FIG. 1 clearly indicates 100% theoretical efficiency and slightly over 1 volt open circuit voltage, both of which are practically independent of temperature over the entire useful range.

Figure 2:
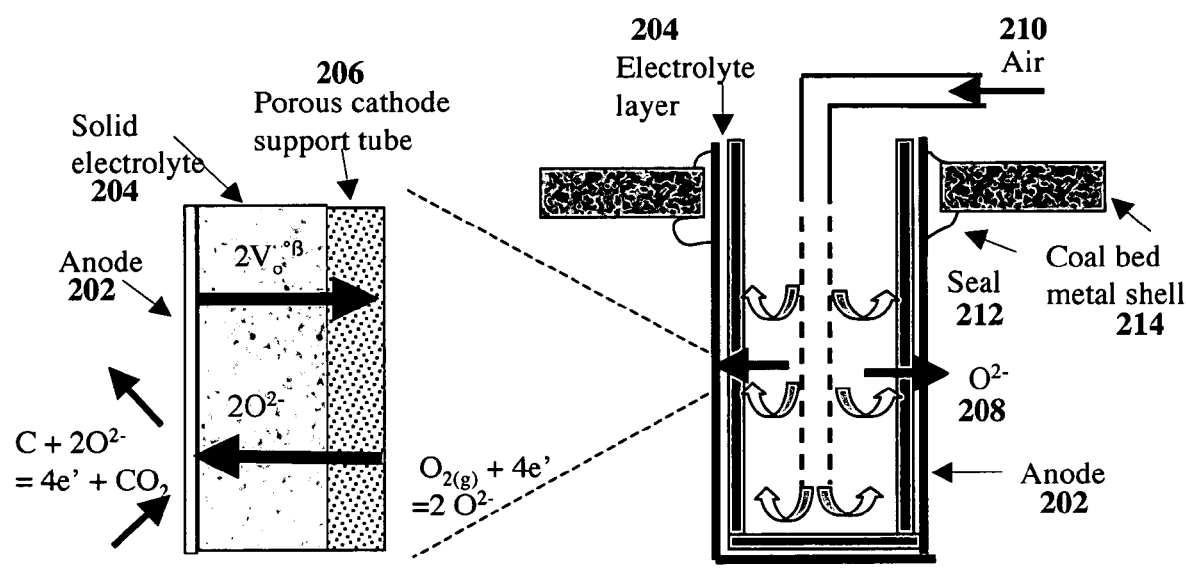

FIG. 2 shows a schematic design and operating principle of the direct carbon fuel cell depicting the details of the cell cross section (not to scale), ionic transport, and electrode reactions. Right: The thin film solid oxide electrolyte (white annulus) is sandwiched between the porous cathode support tube indicated by the inner gray shade, and the outer porous anode layer. Left: solid electrolyte and the cathode allows transport of oxide ion only, which oxidize carbon at the anode and release its electrons to the external circuit generating electricity.

A typical schematic of the fuel cell ceramic tube involves a thick porous ceramic cathode that provides mechanical integrity for the multilayer structure. Another typical schematic of the fuel cell involves flat or corrugated plates of multilayered ceramic membrane assemblies. Other cell geometries, including flat tubes, rectangular or square tubes, and planar configurations, etc. are also possible and is covered under this invention. A thin, impervious layer of yttria stabilized zirconia (YSZ) solid electrolyte is coated on the outer surface of the cathode tube. Another thin but preferably porous layer that serves as the anode is then deposited on top of the YSZ as the outermost layer. A schematic of the tube structure and its operating principle is shown in FIG. 2. Typically, the YSZ and porous anode layers are each 10-50 μm thick, while the cathode support tube may be about 1-2 mm in wall thickness. The porous cathode support tube is made of a mixed conducting perovskite while the porous anode layer is typically made of catalytically active cermet or a mixed conducting oxide.

FIG. 2 shows an anode 202, a solid oxide electrolyte 204, a cathode 206, oxygen ions 208, air 210, a seal 212, and a metal shell 214.

YSZ is the preferred solid electrolyte 204 for its high stability and ionic conductivity. However, scandia stabilized zirconia (SSZ) has an even higher conductivity than its yttria counterpart [T. M. Gür, I. D. Raistrick and R. A. Huggins, Mat. Sci. Engr., 46, 53 (1980)]. Also, it is possible to employ tetragonal zirconia which is known to possess higher conductivity and better thermal shock resistance than cubic zirconia electrolytes. Similarly, other oxide ion conductors such as doped cerates (e.g. $Gd_2O_3 \cdot CeO_2$) and doped gallates (e.g., $La_2O_3 \cdot Ga_2O_2$) can also be considered for the thin electrolyte 204 membrane.

The inner surface of the cathode 206 support tube is in contact with air 210 to furnish the oxygen 208 needed for the oxidation reaction at the anode 202, while the outer surface of the anode 202 is in direct, physical contact with the carbon fuel. The YSZ solid oxide electrolyte 204 film in between serves as a selective membrane for transporting oxygen 208 ions from the air 210, leaving behind the nitrogen. The oxygen 208 picks up electrons from the external circuit through the cathode 206 and is reduced to oxide ions, which are then incorporated into the YSZ solid electrolyte 204.

Using Kroger-Vink defect notation, the electrochemical reduction of oxygen 208 at the cathode 206 takes place as follows:

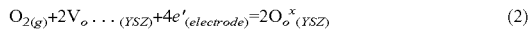

$$O_{2(g)} + 2V_o^{\cdots}{}_{(YSZ)} + 4e'_{(electrode)} = 2O_o^x{}_{(YSZ)} \quad (2)$$

While the oxygen vacancies, $V_o^{\cdots}{}_{(YSZ)}$, migrate under the influence of the chemical potential gradient through the YSZ solid electrolyte 204 film from the anode 202 to the cathode 206, oxygen 208 ions are transported in the reverse direction from the cathode 206 to the anode 202 where they participate in the electrochemical oxidation of carbon.

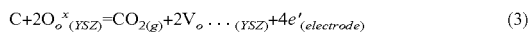

$$C + 2O_o^x{}_{(YSZ)} = CO_{2(g)} + 2V_o^{\cdots}{}_{(YSZ)} + 4e'_{(electrode)} \quad (3)$$

The electrons released during the oxidation reaction at the anode 202 travel through the external circuit towards the cathode 206, producing useful electricity. The oxygen 208 chemical potential difference between the anode 202 and the cathode 206 (i.e., air 210) provides nearly 1 volt of open circuit voltage.

For obtaining maximum conversion efficiency, it is important that the oxidation reaction of carbon primarily takes place at the anode 202 surface by lattice oxygen (i.e., Eq. (3)). The presence of lattice oxygen is preferred in embodiments involving the single temperature reaction zone and the direct physical contact of the anode 202 surface with the particles of carbon-containing fuel.

Expressed this time in ionic notation, the desired reaction is

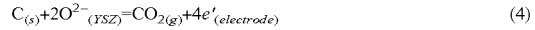

$$C_{(s)} + 2O^{2-}{}_{(YSZ)} = CO_{2(g)} + 4e'_{(electrode)} \quad (4)$$

So many of the gas phase reactions should be minimized. These include the reactions at the solid carbon-gas interface,

$$C_{(s)} + \tfrac{1}{2}O_{2(g)} = CO_{(g)} \quad (5)$$

$$C_{(s)} + O_{2(g)} = CO_{2(g)} \quad (6)$$

as well as the gas phase oxidation of CO by molecular oxygen 208 supplied from the cathode 206 through the YSZ electrolyte 204.

$$CO_{(g)} + \tfrac{1}{2}O_{2(g)} = CO_{2(g)} \quad (7)$$

and the reverse Bouduard reaction that leads to carbon precipitation

$$2CO_{(g)} = C_{(s)} + CO_{2(g)} \quad (8)$$

In short, the desired reaction is (4) for obtaining maximum conversion efficiency. Therefore it is important to bring coal particles in direct physical contact with the active anode 202 surface. This can only be achieved if the anode 202 surfaces and the coal particles reside in immediate physical proximity such that they experience the same temperature regime, and not thermally and spatially separated from one another. Hence, a single temperature zone fuel cell reactor design is the preferred embodiment in this invention where the active surfaces of the anode 202 and the coal particles experience direct physical contact and the same temperature space.

This is achieved by immersing the solid electrolyte 204 containing cell tubes inside the pulverized coal bed, where the coal bed and the tubes reside in the same thermal zone. The coal particles touching the anode 202 surface are readily oxidized by the oxygen 208 provided at the anode 202 surface through the solid electrolyte 204 membrane. Since the electrolyte 204 membrane is selective only to oxygen 208, the nitrogen component of air 210 stays behind in the cathode 206 compartment. This way, there is no $N_2$ or oxides of nitrogen ($NO_x$) produced in the coal bed other than whatever nitrogen was present in the coal feed originally. The absence of $N_2$ and $NO_x$ in the flue gas stream is of course a major advantage of this invention in many important ways. It eliminates emissions of toxic $NO_x$ into the environment, and where regulated, it also eliminates very expensive separation and purification processes for removing $NO_x$ from the flue gases before they are discharged into the atmosphere. Furthermore, it eliminates the latent heat lost to $N_2$ during the combustion process, as is the case in conventional coal-fired power generation technologies. Finally, this invention makes it easy and inexpensive to capture and sequester the $CO_2$ since the flue gases from the direct coal fuel cell is primarily $CO_2$. This point is important for compliance with Kyoto protocols regarding greenhouse gas emissions.

The carbon-fuel comprises any carbon rich substance including: all grades and varieties of coal, charcoal, peat, petroleum coke, oil sand, tar sand, coke, char, carbon produced by pyrolysis of a carbonaceous substance, waste plastics, and biomass. For brevity, the carbon-fuel substances listed above may be referred to as "coal" in this document.

Several different design alternatives are provided as examples to achieve direct, physical contact of the anode 202 surface with the coal particles. Other design alternatives are also possible. These designs may or may not involve recycling or circulation of an inert gas, such as He, Ar, $N_2$ or $CO_2$, to agitate the coal bed to enhance mass transport of reaction products away from the anode 202 surface so as not to block, hinder, or slow down the next unit of oxidation reaction taking place.

The coal bed operates in the temperature range 500 to 1300° C. This range provides the spectrum for the optimum operation of the coal bed and the oxidation process. Thermodynamically, conversion of carbon to carbon dioxide has an inverse temperature dependence and hence is favored more with decreasing temperatures. More specifically, the formation of $CO_2$ is thermodynamically favored at temperatures below about 720° C., while the partial oxidation product CO is stable above this temperature. In other words, the thermodynamic cross over between full oxidation and partial oxidation of carbon occurs around 720° C. Naturally, thermodynamics dictate only the natural tendency of a system to change or react, but does not govern how fast the system undergoes change. Kinetics and diffusion dictate collectively how fast a reaction or change will occur, and this is an exponential function of temperature. So higher temperatures offer faster reaction rates.

Accordingly, the kinetics and product distribution of the carbon conversion reaction is best optimized when the operating temperature range of the coal bed lies between 500 to 1300° C.

There is another consideration that affects the operating temperature of the system. That has to do with the transport of oxide ions through the ceramic electrolyte 204 membrane, which is a highly thermally activated process as discussed earlier, and prefers high operating temperatures. The oxide ions transported across the membrane oxidize the carbon at the anode 202 compartment to generate electricity. In order to produce practically significant and useful levels of electrical current, which is intimately associated with the transport rate of oxide ions through the membrane via the well-known Faraday's equation, the coal bed may operate between 600 and 1100° C., where the ionic conductivity of the electrolyte 204 membrane is larger than $10^{-4}$ S/cm. To obtain even better performance, the coal bed may optionally operate in a temperature range of 700 to 1000° C.

Figure 3:
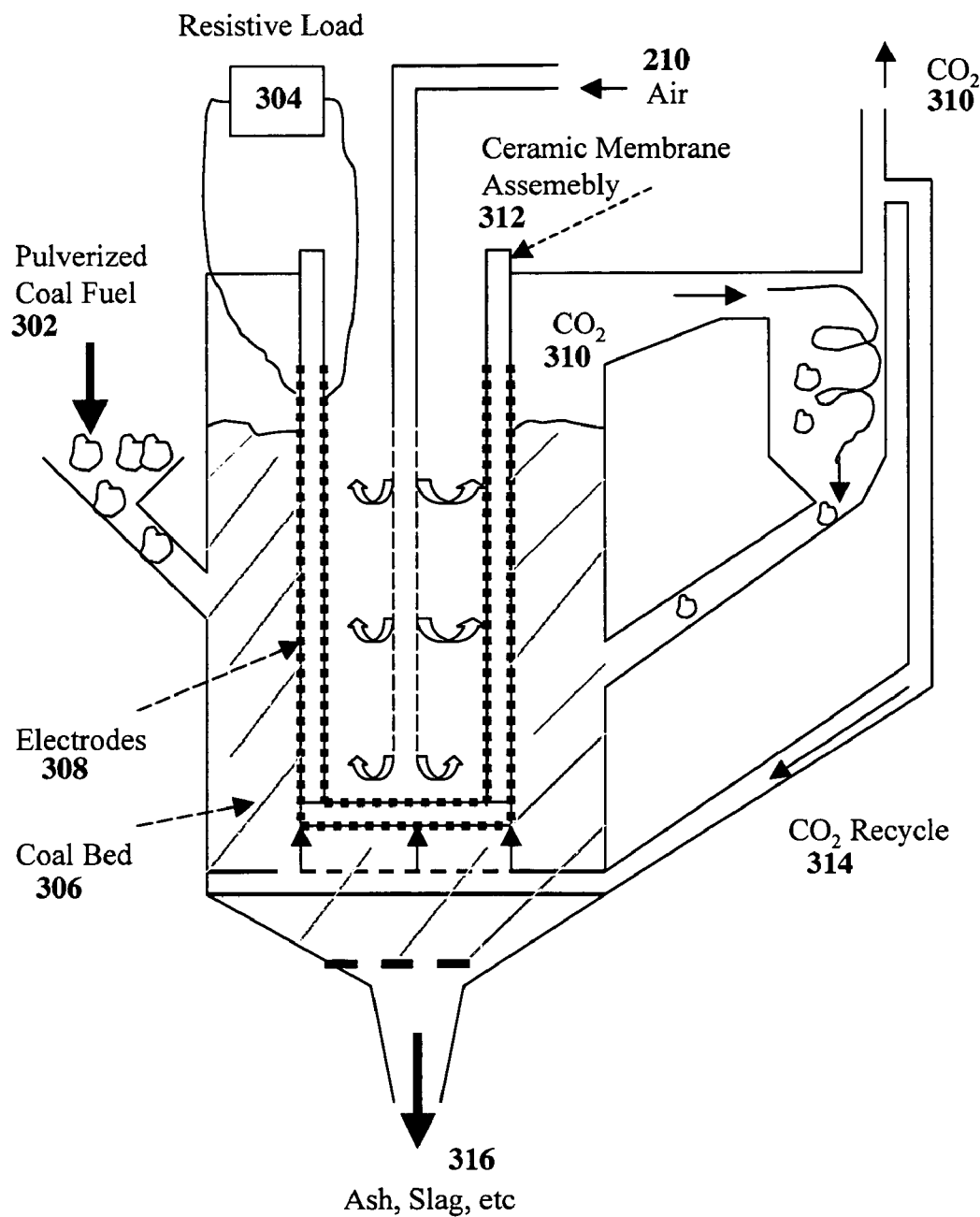
FIG. 3. Schematic stalactite design of the agitated bed direct coal fuel cell illustrates the general design features including one-end closed ceramic tubular cell and the capability to capture any entrained coal particles in a cyclone, and recycling the captured coal particles and part of the $CO_2$ back to the coal bed, the latter in order to enhance mass transport by agitation.

FIG. 3 shows a chematic stalactite design of the agitated bed direct coal fuel cell illustrates the general design features including one-end closed ceramic tubular cell and the capability to capture any entrained coal particles in a cyclone, and recycling the captured coal particles and part of the CO2 back to the coal bed, the latter in order to enhance mass transport by agitation.

FIG. 3 shows coal fuel 302, a resistive load 304, a coal bed 306, electrodes 308, $CO_2$ 310, a membrane assembly 312, recycled $CO_2$ 314, and ash and slag 316.

The schematic of the agitated bed direct coal fuel cell shown in FIG. 3 illustrates the general design features including the stalactite design of one-end closed ceramic tubular cell. The agitated bed is preferably made of a stainless steel shell with proper ports for feeding the pulverized coal into the bed, and discharging the flue gases. It also has the capability to capture any entrained coal particles in a cyclone, and recycling both the captured coal particles and part of the $CO_2$ gas 314 back to the coal bed 306, the latter in order to enhance mass transport by agitation of the coal bed 306 by gas flow.

Figure 4:
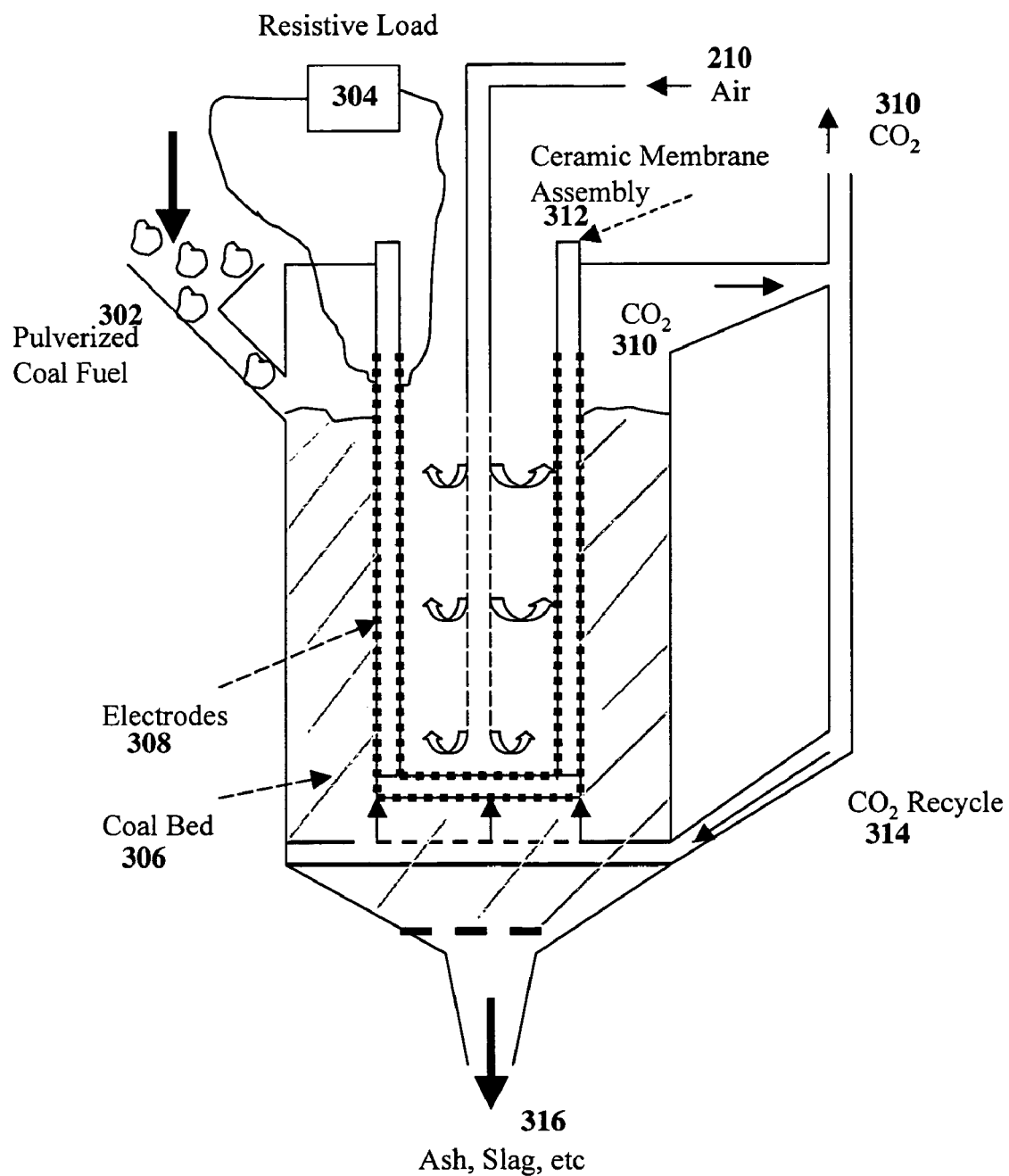
FIG. 4. Schematic stalactite design of the agitated bed direct coal fuel cell illustrates the general design features including one-end closed ceramic tubular cell and recycling part of the $CO_2$ back to the coal bed in order to enhance mass transport by agitation.

FIG. 4 shows a schematic stalactite design of the agitated bed direct coal fuel cell illustrates the general design features including one-end closed ceramic tubular cell and recycling part of the CO2 back to the coal bed in order to enhance mass transport by agitation.

Figure 5:
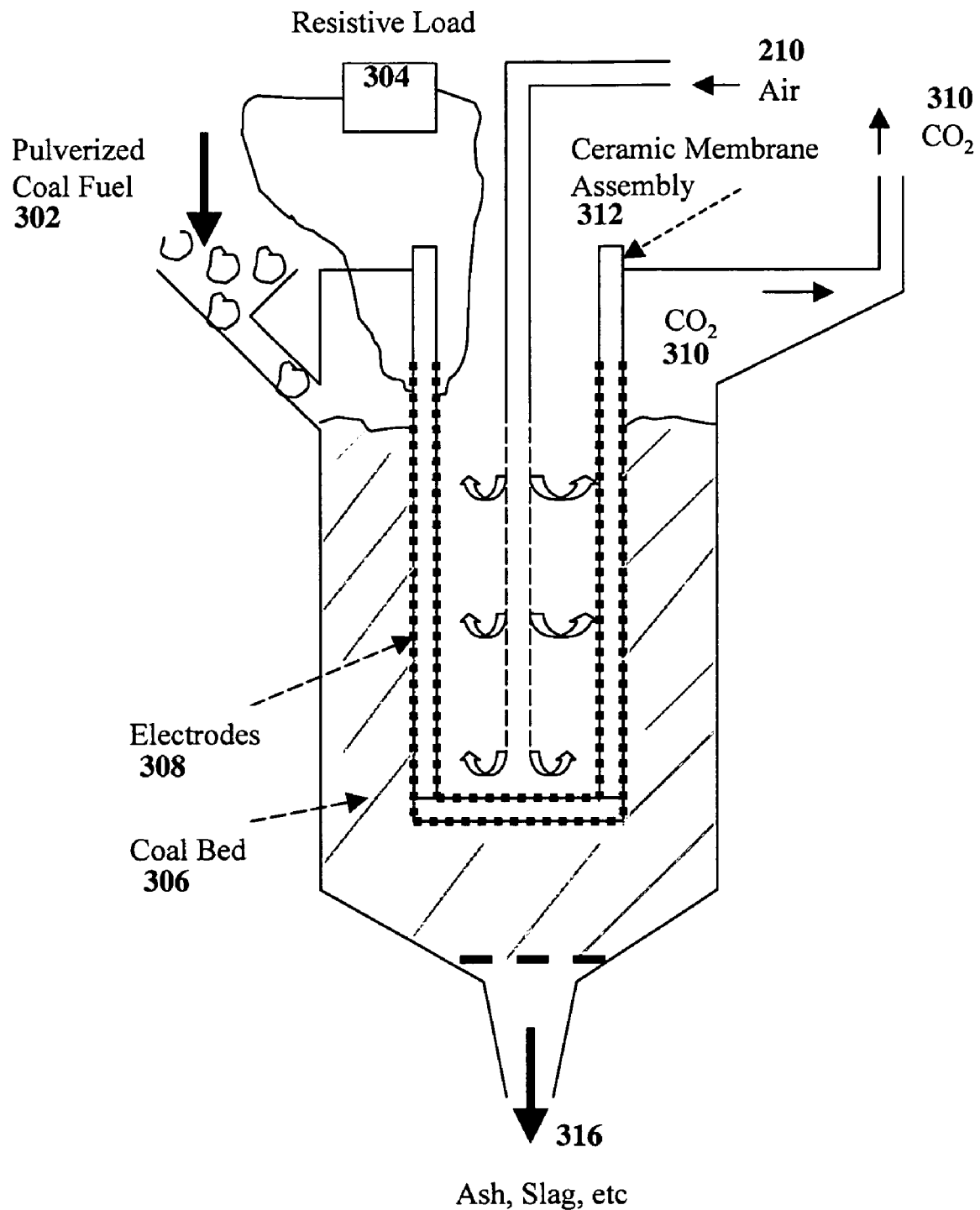
FIG. 5. Schematic stalactite design of the immersion bed direct coal fuel cell illustrates the general design features including one-end closed ceramic tubular cell. There is no recycling of the $CO_2$ back to the coal bed for agitation.

FIG. 5 shows a schematic stalactite design of the immersion bed direct coal fuel cell illustrates the general design features including one-end closed ceramic tubular cell. There is no recycling of the CO2 back to the coal bed for agitation.

Variant modes of the stalactite design are shown in FIGS. 4 and 5 as examples, where the former shows only $CO_2$ recycling 314 for agitation of the coal bed 306.

Another design concept shown in FIG. 5 is an immersion bed direct coal fuel cell where the coal bed 306 is immobile and there is no forced agitation of the bed caused by the recycling of the $CO_2$ product gas.

Figure 6:
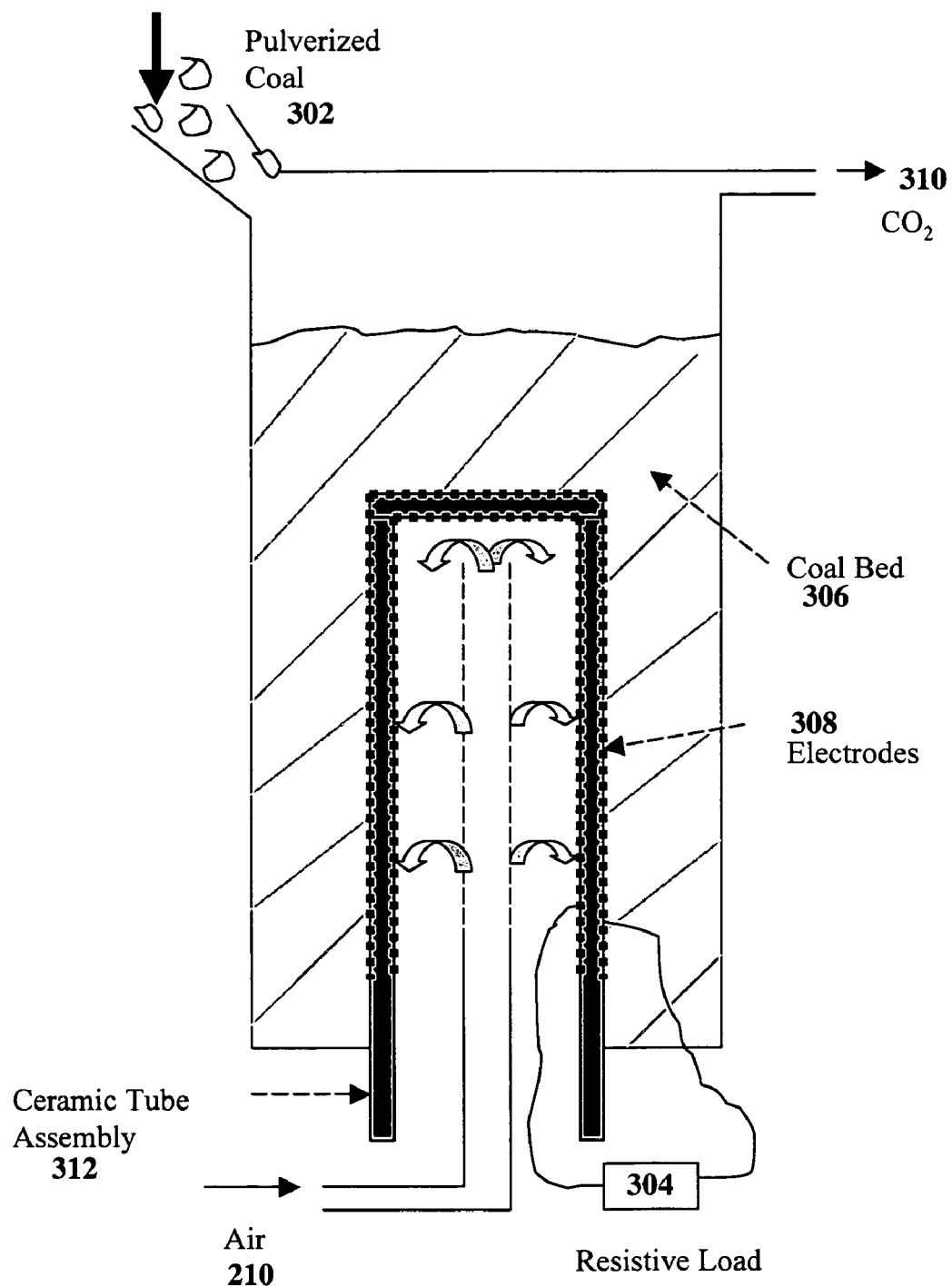
FIG. 6. Schematic stalagmite design of the immersion bed direct coal fuel cell illustrates the general design features including one-end closed ceramic tubular cell. There is no recycling of the $CO_2$ back to the coal bed for agitation.

FIG. 6 shows a schematic stalagmite design of the immersion bed direct coal fuel cell illustrates the general design features including one-end closed ceramic tubular cell. There is no recycling of the CO2 back to the coal bed for agitation.

Yet another design concept is the stalagmite configuration of the ceramic tube cells as depicted in FIG. 6, which also illustrates an immersion type of coal bed 306 operation without $CO_2$ recycling 314. Naturally, the stalagmite design concept is also possible for the other modes of operation described above, as well as others.

Figure 7:
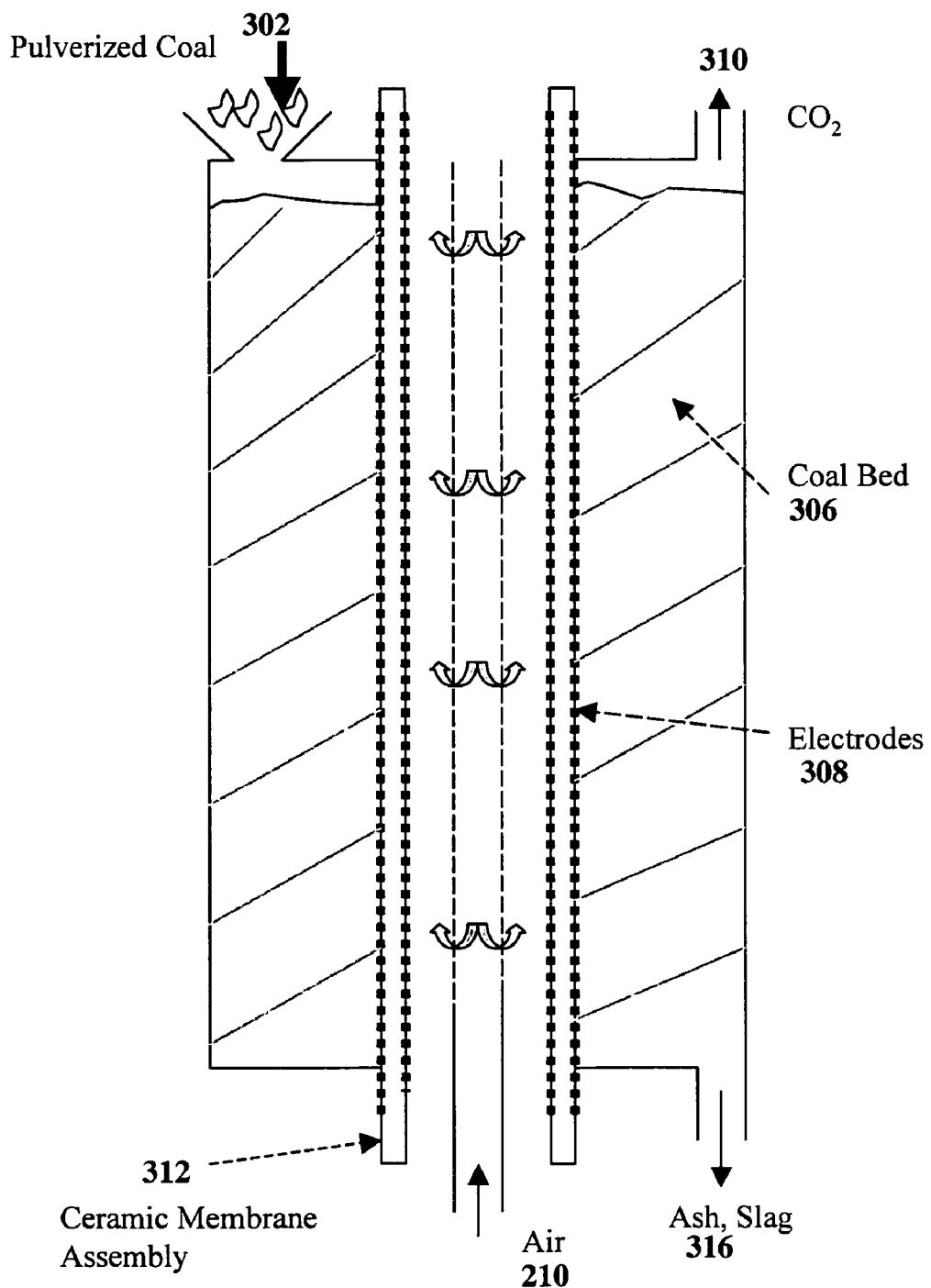
FIG. 7. Shell-and-tube type design where the pulverized coal bed is outside the tube in touch with the anode surface. This particular schematic does not illustrate $CO_2$ or captured coal recycling, but these features can easily be incorporated and falls within the scope of this invention.

FIG. 7 shows a shell-and-tube type design where the pulverized coal bed is outside the tube in touch with the anode surface. This particular schematic does not illustrate CO2 or captured coal recycling, but these features can easily be incorporated and falls within the scope of this invention.

Other design concepts may include shell-and-tube type design where the pulverized coal bed 306 is outside the tube in touch with the anode 202 surface as illustrated in FIG. 7. This particular schematic does not illustrate $CO_2$ 314 or captured coal recycling, but these features can easily be incorporated and falls within the scope of this invention.

Figure 8:
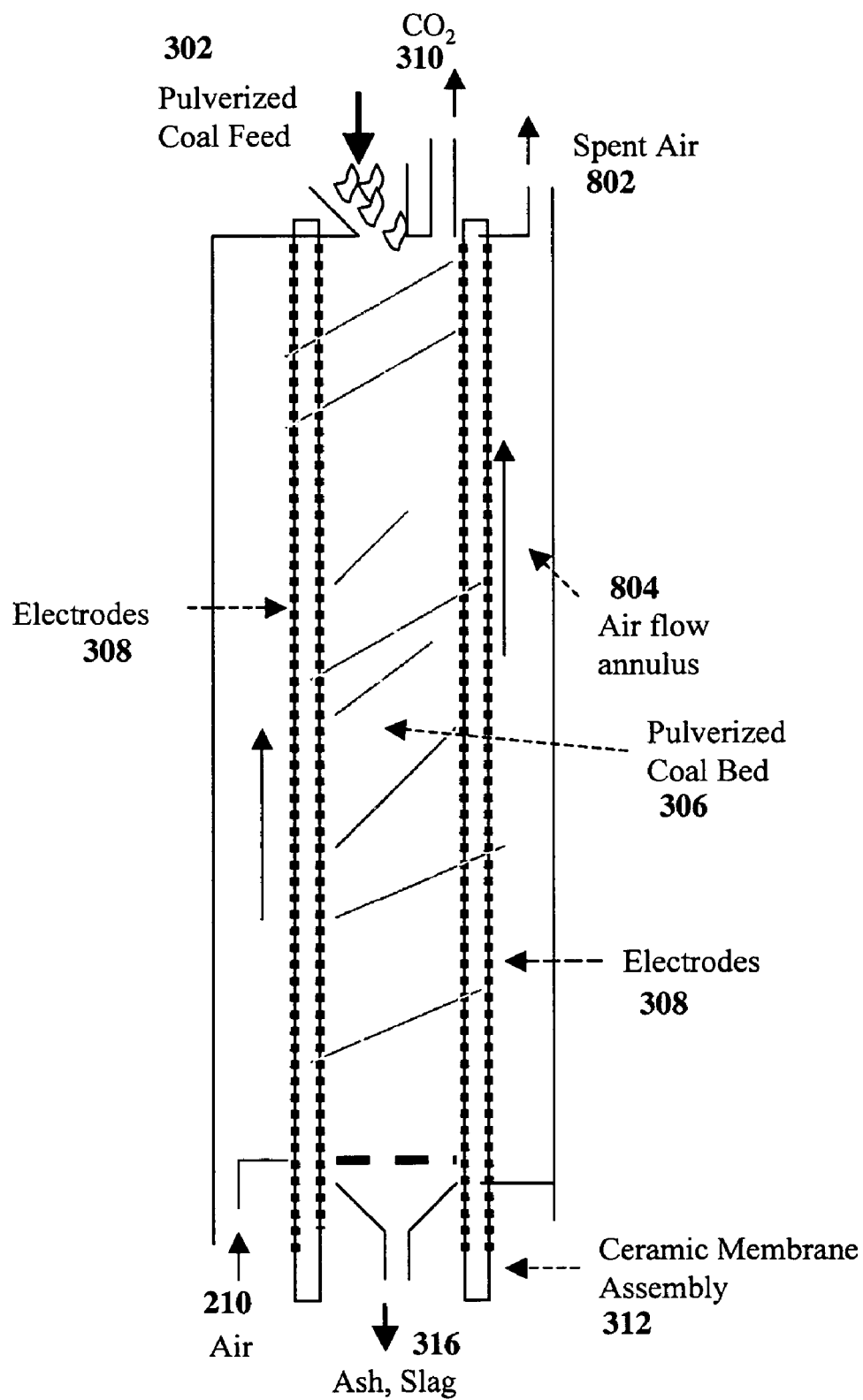
FIG. 8. Shell-and-tube type design (inverted version of FIG. 7) where the pulverized coal bed is now inside the tube in touch with the anode surface that is also inside the tube. The annulus between the metal shell and the cathode surface facing the metal shell allows a flow of air. This particular schematic does not illustrate $CO_2$ or captured coal recycling, but these features can easily be incorporated and falls within the scope of this invention.

FIG. 8 shows spent air 802 and an air flow annulus 804.

FIG. 8 shows a shell-and-tube type design (inverted version of FIG. 7) where the pulverized coal bed is now inside the tube in touch with the anode surface that is also inside the tube. The annulus between the metal shell and the cathode surface facing the metal shell allows a flow of air. This particular schematic does not illustrate CO2 or captured coal recycling, but these features can easily be incorporated and falls within the scope of this invention.

Another variant of this is the inverted shell-and-tube type design (i.e., inverted version of FIG. 7) where the pulverized coal bed 306 is now inside the tube in touch with the anode 202 surface that is also inside the tube as shown in FIG. 8. The annulus between the metal shell and the cathode 206 surface facing the metal shell allows a flow of air 210. This particular schematic does not illustrate $CO_2$ 314 or captured coal recycling, but these features can easily be incorporated and falls within the scope of this invention.

Figure 9:
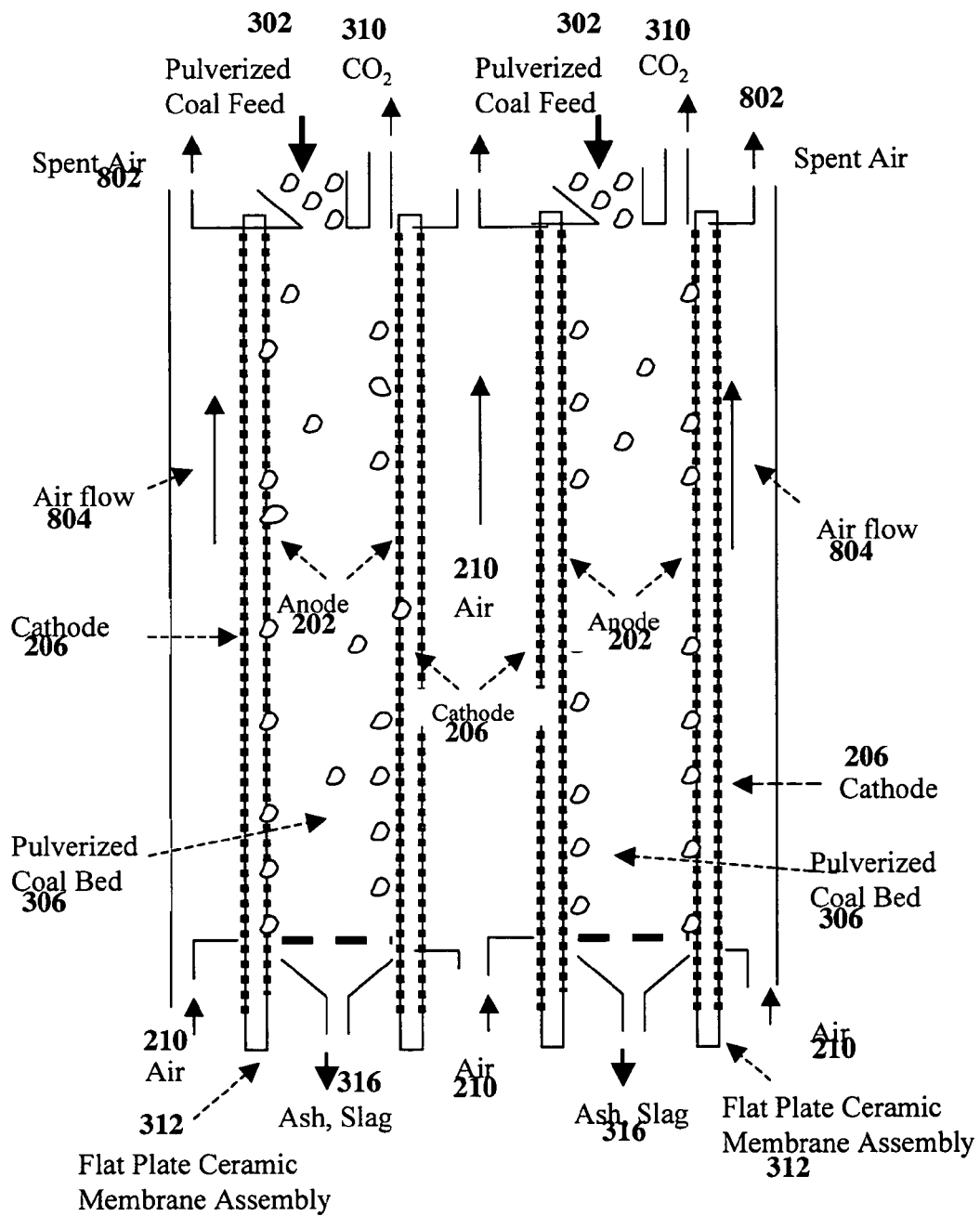
FIG. 9. Schematic of the two-chamber flat plate fluidized bed fuel cell design where the pulverized coal bed is in touch with the anode surfaces of the ceramic membrane assemblies. More chambers are possible. This particular schematic also applies to corrugated plate design of ceramic membrane assemblies. It does not illustrate $CO_2$ or captured coal recycling, but these features can easily be incorporated and falls within the scope of this invention.

FIG. 9 shows a schematic of a two chamber flat plate fluidized bed design where the pulverized coal bed is in touch with the anode surfaces of the ceramic membrane assemblies. More chambers are possible. This particular schematic also applies to corrugated plate design of the ceramic membrane assemblies. It does not illustrate CO2 or captured coal recycling, but these features can easily be incorporated and falls within the scope of this invention.

Although similar in operation, another design geometry involves the use of flat or corrugated planar ceramic membrane assemblies 312. These are multilayered structures that consist of porous anode 202 (or cathode 206) support plates coated with thin impervious layers of the oxide conducting solid electrolyte 204 membrane, over which there is coated another thin but porous electrode layer to complete the fuel cell structure. The plates are stacked in parallel fashion in the reactor as shown in FIG. 9 such that the anode 202 surfaces face each other. Carbon-fuel 302 is fed in between the anode 202 surfaces in alternating pairs of plates while air 210 is flown along the outer surfaces that act as cathodes for the reduction of oxygen 208.

Yet another mode of operating the direct coal fuel cell is to couple it to $CO_2$ and $SO_2$ sequestration either inside the bed or outside the bed. Sequestration of $CO_2$ and $SO_2$ can be achieved inside the bed by introducing gettering agents such as calcium oxide, magnesium oxide, dolomite, a variety of micas, clays, and zeolites, or a variety of magnesium silicates (e.g., olivine, serpentine, talc) mixed with pulverized coal and fed directly into the bed. Mica, clay and zeolite individually refer to large families of minerals and materials. Examples of micas include muscovite, biotite, lepidolite and phlogopite; clays include montmorillonite, bentonite, hematite, illite, serpentine, and kaolinite; and zeolites include clinoptilolite, chabazite, phillipsite, mordenite, molecular sieves 13X, 5A, and ZSM-5. Of course, other members of the mica, clay and zeolite families are also applicable under this invention. All these inorganic compounds may be used to sequester carbon dioxide and oxides of sulfur. The gettering agents readily react with these oxidation products inside the bed forming solid carbonates and sulfates which eventually settle to the bottom of the bed due to their much denser bodies compared to coal, where they can be extracted. Or the flue gas leaving the bed can be treated with these gettering agents in a separate containment outside the bed where the reaction products $CO_2$ and $SO_2$ can easily be sequestered by fixing them as solid carbonates and sulfates. Some of the relevant reactions for mineral carbonization are provided below as examples.

Lime: $CaO+CO_2=CaCO_3$
Magnesia: $MgO+CO_2=MgCO_3$
Serpentine: $Mg_3Si_2O_5(OH)_{4(s)}+3CO_{2(g)}=3\ MgCO_{3(s)}+2\ SiO_{2(s)}+2\ H_2O$
Olivine $Mg_2SiO_{4(s)}+2\ CO_{2(g)}=2\ MgCO_{3(s)}+SiO_{2(s)}$ There are many embodiments of the present invention:
A fuel cell using a single temperature zone.
A fuel cell using direct physical contact (or touching) of anode surface with the coal particles.
A fuel cell using immersion or agitated bed to materialize contact.
A fuel cell using carbon directly, rather than intermediate conversion of coal to gaseous products.
A method of converting coal to electricity without the use of large quantities of water in contrast to the current technologies employed in coal-fired power plants
A fuel cell wherein there is a one step process for direct conversion of coal to electrical energy.
A process that does not combust coal, but oxidizes it.
A fuel cell that utilizes solid oxide electrolyte to supply the oxygen for the electrochemical oxidation of coal.
A fuel cell that produces highly concentrated (85-95% $CO_2$) flue gas that enables easy capturing and sequestration of the carbon dioxide.
A fuel cell that offers single source collection of $CO_2$.
A fuel cell that utilizes mineral carbonization.
A fuel cell that offers potentially near-zero emissions and stackless operation.

What is claimed is:
1. A fuel cell comprising:
a solid anode, wherein said solid anode is a chemically non-reactive and non-consumable anode that is chemically stable in composition and structure, wherein said solid anode is catalytically active;
a solid cathode, wherein one surface of said cathode is in contact with air, wherein said air supplies oxygen to said cathode;
a solid oxide electrolyte that selectively transports oxide ions from said cathode to said anode for an oxidation reaction, wherein said electrolyte is disposed between said solid anode and said solid cathode; and
a single temperature zone,
wherein a surface of said anode is in direct physical contact with a carbon-containing fuel and electrical current is generated by said oxidation of said carbon-containing fuel by said oxygen.

2. The fuel cell of claim 1, where there is capture of carbon dioxide and sulfur-containing species achieved by an inorganic compound introduced to said anode.

3. The fuel cell of claim 1, where there is capture of $CO_2$ and sulfur-containing species achieved by introducing a gettering agent, wherein said gettering agent is selected from a group consisting of calcium oxide, magnesium oxide, dolomite, olivine, serpentine, talc, mica, clay, and zeolite.

4. The fuel cell of claim 1, where there is direct physical contact of a surface of said solid anode with said carbon-containing fuel, wherein said carbon-containing fuel is a solid fuel and/or a gaseous fuel.

5. The fuel cell of claim 1, where-said oxidation of said carbon-containing fuel is by lattice oxygen provided through said solid oxide electrolyte to said solid anode.

6. The fuel cell of claim 1, where said solid anode resides in a compartment, wherein said compartment comprises a fixed bed of carbon-fuel with no forced gas flow.

7. The fuel cell of claim 1, where said solid anode resides in a compartment, wherein said compartment comprises a carbon-containing fuel bed agitated by forced gas flow.

8. The fuel cell of claim 1, where said solid anode resides in a compartment, wherein said compartment comprises a carbon-containing fuel bed fluidized by forced gas flow.

9. The fuel cell of claim 8, wherein agitating or said fluidizing gas flow is provided by product gases of said anode oxidation reaction, wherein said reaction product gases are partially recycled back to said carbon containing fuel bed.

10. The fuel cell of claim 8, wherein said gas flow into said anode compartment comprises anode effluent gases that are recycled back into solid said carbon-containing fuel bed.

11. The fuel cell of claim 1, where said carbon-containing fuel comprises a carbon rich substance.

12. The fuel cell of claim 1, where there is a generally shell-and-tube configuration, where there is a bed of carbon-containing fuel that is outside of said tube and in contact with said solid anode.

13. The fuel cell of claim 1, where there is a generally shell-and-tube configuration, where there is a bed of carbon-containing fuel that is inside of tube and in contact with said solid anode.

14. The fuel cell of claim 1, where alternating compartments of carbon-fuel beds and air flow spaces are geometrically disposed in parallel, where said alternating compartments are separated by flat or corrugated ceramic membrane fuel cell assemblies, and where there is a bed of carbon-containing fuel that is in contact with said solid anode.

15. The fuel cell of claim 1, where said fuel cell has an operating temperature in the range, 500 to 1300 degrees Centigrade.

16. The fuel cell of claim 15, where said operating temperature is in the range 600 to 1100 degrees Centigrade.

17. The fuel cell of claim 16, where said operating temperature is in the range 700 to 1000 degrees Centigrade.

18. The fuel cell of claim 1, where said carbon-containing fuel comprises a solid at an operating temperature of said fuel cell.

19. The fuel cell of claim 1, where said carbon-containing fuel is selected from a group consisting of coal, charcoal, peat, coke, char, petroleum coke, oil sand, tar sand, waste plastics, biomass, agriculture and forest waste, municipal waste, human and biological waste, and carbon produced by pyrolysis of a carbonaceous substance of solid, liquid or gaseous form.

20. The fuel cell of claim 1, wherein said solid anode is in a shape selected from a group consisting of a tube, a flat tube, a rectangular tube, a square tube, a planar configuration and a corrugated plate.

21. The fuel cell of claim 1, wherein said solid anode is made from material selected from a group consisting of catalytically active cermet and/or a mixed conducting oxide.

22. The fuel cell of claim 1, wherein said cathode is made from a porous ceramic material.

23. The fuel cell of claim 1, where said solid anode resides in a compartment, wherein said compartment comprises a carbon-containing fuel bed, wherein said carbon-containing fuel bed comprises reaction product gases, wherein said reaction product gases are substantially carbon monoxide.

24. A method for the oxidation of a carbon-containing fuel to generate electricity utilizing a fuel cell comprising:

providing a solid anode, wherein said solid anode is a chemically non-reactive and non-consumable anode that is chemically stable in composition and structure, wherein said solid anode is catalytically active;

providing a solid cathode, wherein one surface of said cathode is in contact with air, wherein said air supplies oxygen to said solid cathode; and providing a solid oxide electrolyte that selectively transports oxide ions from said cathode to said anode for an oxidation reaction, wherein said electrolyte is disposed between said anode and said cathode, wherein said fuel cell uses a single temperature zone, and wherein electrical current is generated by said oxidation of said carbon-containing fuel by said oxygen.

25. The method of claim 24, where said fuel cell operates at a temperature between 500 and 1300 degrees Centigrade.

26. The method of claim 24, wherein said solid anode is in a shape selected from a group consisting of a tube, a flat tube, a rectangular tube, a square tube, a planar configuration and a corrugated plate.

27. The method of claim 24, wherein said solid anode is made from material selected from a group consisting of catalytically active cermet and/or a mixed conducting oxide.

28. The method of claim 24, wherein said cathode is made from a porous ceramic material.

29. The method of claim 24, wherein said anode comprises a porous microstructure.

30. The method of claim 24, where said solid anode resides in a compartment, wherein said compartment comprises a carbon-containing fuel bed, wherein said carbon-containing fuel bed comprises reaction product gases, wherein said reaction product gases are substantially carbon monoxide.

* * * * *